(12) United States Patent
Cheal

(10) Patent No.: US 7,597,342 B2
(45) Date of Patent: Oct. 6, 2009

(54) ENERGY ABSORBING FEATURE FOR INFLATABLE CURTAIN AIRBAG

(75) Inventor: Blake L. Cheal, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 269 days.

(21) Appl. No.: 11/441,538

(22) Filed: May 26, 2006

(65) Prior Publication Data

US 2007/0273128 A1    Nov. 29, 2007

(51) Int. Cl.
*B60R 21/213*    (2006.01)
(52) U.S. Cl. .................. 280/728.2; 280/730.2
(58) Field of Classification Search ............. 280/730.2, 280/728.3, 728.2
See application file for complete search history.

(56) References Cited

U.S. PATENT DOCUMENTS

| | | |
|---|---|---|
| 1,675,957 A | 7/1928 | Reeves |
| 2,494,882 A | 1/1950 | Kost |
| 2,649,311 A | 8/1953 | Hetrick |
| 2,672,905 A | 3/1954 | Hartman et al. |
| 2,730,420 A | 1/1956 | Bruck |
| 2,755,125 A | 7/1956 | Hodges |
| 2,771,113 A | 11/1956 | Flora |
| 2,834,606 A | 5/1958 | Bertrand |
| 3,140,071 A | 7/1964 | Lorentzen |
| 3,523,299 A | 8/1970 | Tinnermann |
| RE29,752 E | 9/1978 | Jaconette, Jr. |
| 4,200,027 A | 4/1980 | Oehlke |
| 4,714,392 A | 12/1987 | Muller et al. |
| 5,209,519 A | 5/1993 | Shiga et al. |
| 5,340,148 A | 8/1994 | Faigle et al. |
| 5,470,103 A | 11/1995 | Vaillancourt et al. |
| 5,602,736 A | 2/1997 | Toya et al. |
| 5,692,768 A | 12/1997 | Mihm et al. |
| 5,707,192 A | 1/1998 | Vortriede et al. |

(Continued)

FOREIGN PATENT DOCUMENTS

DE    299 16 177 U1    2/2000

(Continued)

OTHER PUBLICATIONS

"U-Nuts & J-Nuts," Mr. G's Fasteners, pp. 74-77.

*Primary Examiner*—Paul N Dickson
*Assistant Examiner*—Nicole Verley
(74) *Attorney, Agent, or Firm*—Sally J. Brown; Madson IP, P.C.

(57) ABSTRACT

A new type of mounting system that may be used to mount an inflatable curtain airbag to a vehicle is described herein. This mounting system uses a "P-type" mounting bracket, which is designed such that the all (or substantially all) of the rolled inflatable curtain will be positioned above the bracket. An energy absorbing member is also associated with the P-type mounting bracket. When the inflatable curtain is in the rolled configuration, the energy absorbing member will engage the inflatable curtain. The energy member will also deform and absorb energy when the inflatable curtain is deployed from the rolled configuration into the deployed configuration. The mounting bracket may also include a curved arm that engages the inflatable curtain in the rolled configuration. The curved arm may be designed such that deployment of the inflatable curtain into the deployed configuration deforms the curved arm.

14 Claims, 4 Drawing Sheets

U.S. PATENT DOCUMENTS

| | | |
|---|---|---|
| 5,775,726 A | 7/1998 | Timothy et al. |
| 5,827,026 A | 10/1998 | Patti |
| 6,029,996 A | 2/2000 | Yoshioka et al. |
| 6,103,984 A | 8/2000 | Bowers et al. |
| 6,135,495 A | 10/2000 | Redgrave et al. |
| 6,142,506 A * | 11/2000 | Patel et al. ............... 280/728.2 |
| 6,146,071 A | 11/2000 | Norkus et al. |
| 6,168,186 B1 | 1/2001 | Welch et al. |
| 6,234,517 B1 | 5/2001 | Miyahara et al. |
| 6,237,941 B1 | 5/2001 | Bailey et al. |
| 6,305,707 B1 | 10/2001 | Ishiyama et al. |
| 6,336,779 B1 | 1/2002 | Jakob et al. |
| 6,361,068 B1 | 3/2002 | Stein et al. |
| 6,450,747 B1 | 9/2002 | Fischer |
| 6,464,250 B1 | 10/2002 | Faigle et al. |
| 6,474,678 B1 | 11/2002 | Boxey |
| 6,793,241 B2 * | 9/2004 | Wallner et al. ........... 280/730.2 |
| 6,802,527 B2 * | 10/2004 | Schmidt et al. .......... 280/728.2 |
| 7,182,366 B2 * | 2/2007 | Enriquez ................. 280/730.2 |
| 7,407,182 B2 * | 8/2008 | Aoki et al. ............... 280/730.2 |
| 2003/0052476 A1 | 3/2003 | Rose |
| 2005/0029778 A1 | 2/2005 | Weber et al. |
| 2006/0043704 A1 * | 3/2006 | Coon et al. ............. 280/730.2 |
| 2006/0119084 A1 * | 6/2006 | Coon et al. ............. 280/730.2 |

FOREIGN PATENT DOCUMENTS

| | | |
|---|---|---|
| DE | 198 60 933 A1 | 7/2000 |
| EP | 0 904 992 A2 | 3/1999 |
| GB | 2 309 942 A | 8/1997 |
| GB | 2 345 669 A | 7/2000 |
| GB | 2 367 535 A | 4/2002 |
| JP | 7-117605 | 5/1995 |
| JP | 10-264761 | 10/1998 |
| JP | 11-291854 | 10/1999 |
| WO | WO-2005/049390 | 6/2005 |

* cited by examiner

ENERGY ABSORBING FEATURE FOR INFLATABLE CURTAIN AIRBAG

BACKGROUND OF THE INVENTION

1. Field of the Invention

The present invention relates to attaching an airbag to the interior of a vehicle. More specifically, the present invention relates to an energy absorbing feature that may be used in conjunction with a mounting bracket to mount an inflatable curtain airbag to a vehicle.

2. Description of Related Art

Inflatable airbags are well accepted for use in motor vehicles and have been credited with preventing numerous deaths and injuries. In fact, the inclusion of inflatable safety restraint devices, or airbags, is now a legal requirement for many new vehicles. Airbags are typically installed throughout the passenger cabin of a vehicle, including the steering wheel. In the event of an accident, an accelerometer within the vehicle measures the abnormal deceleration and triggers the expulsion of rapidly expanding gases from an inflator. The expanding gases fill the airbags, which quickly inflate in front of the driver and passenger to protect them from impact against the windshield, dashboard, steering wheel, or other portions of the vehicle. Side impact airbags, such as curtain airbags, have also been developed in response to the need for protection from impacts in a lateral direction or against the side of the vehicle.

Recently, airbag technology has continued to advance such that curtain airbags are now enlisted to provide roll-over protection. (These airbags are sometimes referred to as "inflatable curtains.") During a roll-over accident, the vehicle occupants can be jostled considerably, thereby causing the occupant to impact various parts of the vehicle interior. Even worse, the occupant may be ejected from the vehicle. Alternatively, a head or limb of an occupant may extend outside the vehicle during the roll-over. Such "occupant excursion" during roll-over accidents is a common cause of automotive fatalities, particularly in the case of vehicle occupants that are not wearing a seat belt during the roll-over.

Conventional curtain airbags attempt to combat the dangers of side impact or roll-over accidents by having a curtain airbag unroll or unfold downward from the roof of the vehicle and then inflate beside the person as a means of preventing the person from hitting the door, the window, or the side of the vehicle during lateral impact. Since a vehicle occupant may be leaning forward, reclined in the seat, or at any position in between, such airbags are typically long enough to cover the whole interior side of the vehicle, protecting occupants in both the front and rear occupant seats.

Generally, the curtain airbags must be sized to hold large volumes of inflation gas and descend below the window sill. Consequently, when not inflated the curtain airbag includes a significant amount of material. This material is then rolled, folded, or otherwise gathered to form a tight, tubular bundle. A sock that fits around the curtain may also be added to ensure that the curtain airbag is kept rolled or folded.

Generally, there are two types of mounting brackets that are used to mount inflatable curtains to the vehicle. The first type is sometimes referred to as a "conventional" bracket and is designed such that all (or substantially all) of the inflatable curtain, when mounted, will be positioned below the mounting bracket. A second type of mounting bracket is a "P-type" mounting bracket (which is sometimes called a "P-roll" bracket). In the P-type mounting bracket, the bracket is designed such that all (or substantially all) of the inflatable curtain, when mounted, will be positioned above the mounting bracket. (These brackets are called "P-type" because when the curtain is positioned above the bracket, the overall shape of the bracket and curtain resembles the shape of the letter "P"). An example of a P-type bracket that is known in the art is disclosed in a PCT patent publication that is published as International Publication No. WO 2005/049390. (This patent publication is referred to herein as the "390 application" and is expressly incorporated herein by reference.) Of course, other types of P-type mounting brackets are also known and used in the art.

The present paper is specifically devoted to addressing one or more of the problems associated with known P-type mounting brackets. As is known in the art, P-type brackets are designed such that during deployment of the inflatable curtain, the curtain rolls downward and over the bracket. This deployment must occur very quickly in order to protect the occupant during the crash. Accordingly, the gas entering the inflatable curtain during deployment will be highly pressurized and will cause the inflatable curtain to move/deploy very rapidly.

This rapid movement of the inflatable curtain during deployment places severe stress to the mounting bracket that is securing the inflatable curtain to the vehicle. In fact, in some situations, such rapid movement of the inflatable curtain has caused the P-type mounting bracket to fail, break, and/or separate from the vehicle structure. Obviously, such "failure" of the mounting bracket is undesirable. As such, manufactures often use multiple layers of fabric and/or reinforced fabric tabs in order to ensure that such "failure" of the mounting bracket does not occur.

Unfortunately, the use of these multiple and/or reinforced mounting brackets significantly raises the cost of the overall inflatable curtain airbag system. Accordingly, it would be an advancement in the art to provide a new system that uses P-type mounting brackets that is low cost and does not require the use of multiple and/or reinforced brackets to ensure proper functioning. Such a device is disclosed herein.

BRIEF SUMMARY OF THE INVENTION

The present embodiments comprise a mounting system that may be used to mount an inflatable curtain to a vehicle. As is known in the art, the inflatable curtain will generally have a rolled configuration and a deployed configuration. The curtain will be mounted to the vehicle via a P-type mounting bracket.

A variety of different P-type mounting brackets may be used in the present mounting system. In general, these mounting brackets will all include a back member and a front member. The bracket is designed such that, when used in a vehicle, a portion of the inflatable curtain will fit between the front and back members. A fastener may then be added to compress the front member onto the back member and secure the portion of the inflatable curtain between the back and front members. This fastener will also engage the vehicle and connect the mounting bracket to the vehicle surface.

The mounting system also includes an energy absorbing member. When the curtain is in the rolled configuration, the energy absorbing member will engage a portion of the curtain. The energy absorbing member will be "associated with" the mounting bracket. In some embodiments, this "association" between the bracket and the energy absorbing member will occur by having the energy absorbing member be attached to the bracket. In other embodiments, the "association" between the energy absorbing member and the bracket occurs by having the energy absorbing member be integral with the bracket. In yet further embodiments, the association between the mounting bracket and the energy absorbing member means that, when in use, the energy absorbing member will contact or engage a portion of the mounting bracket.

The mounting bracket may additional comprise a curved arm that is attached to the back member of the mounting bracket. The curved arm will engage a portion of the inflatable curtain when the curtain is in the rolled configuration. In some embodiments, the curved arm will have an inverted U-shape and be positioned on top of the rolled inflatable curtain.

As noted above, the energy absorbing member will engage a portion of the inflatable curtain when the inflatable curtain is in the rolled configuration. In some embodiments, this will occur by having the leading edge contact/engage a bottom portion of the rolled curtain. Other embodiments will be constructed such that the energy absorbing member engages/contacts in other ways. Still further embodiments may be constructed such that portions of the energy absorbing member other than the leading edge contact/engage the rolled curtain.

The mounting system is designed such that the deployment of the curtain into the deployed configuration will deform the curved arm. More specifically, as the curtain inflates and moves, the force of the movement will deform the curved arm. In some embodiments, this deformation of the curved arm means that after deployment of the curtain, the curved arm will no longer have an inverted U-shape. In other embodiments, the deformation of the curved arm will mean that after deployment of the curtain, the curved arm will be perpendicular or substantially perpendicular to the back member.

Unlike other previously known mounting systems, the mounting system of the present embodiments is designed such that the energy absorbing member will deform and absorb energy when the inflatable curtain is deployed from the rolled configuration into the deployed configuration. More specifically, because the leading edge (or another portion of the energy absorbing member) engages the curtain, the deployment/movement of the curtain will, of necessity, deform and move the energy absorbing member. By deforming the energy absorbing member, the mounting system dissipates some of the energy of deployment and ensures that deployment does not cause the mounting bracket to separate from the vehicle or curtain tabs do not separate from bracket.

In some embodiments, the energy absorbing member will deform in the substantially the same direction as the direction of deployment of the inflatable curtain. Yet further embodiments will be designed such that energy absorbing member will deform into an inverted U-shape in which a portion of the energy absorbing member is relatively parallel to the front member. Of course, in other embodiments of the mounting system, the energy absorbing member may deform in other ways and/or in other directions.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
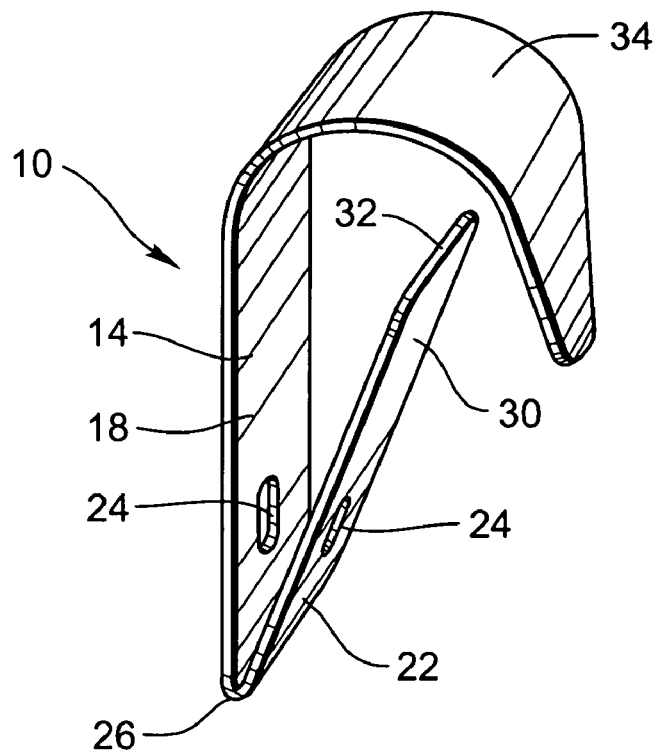
FIG. 1 is a perspective view of a mounting system according to the present embodiments.
Figure 2:
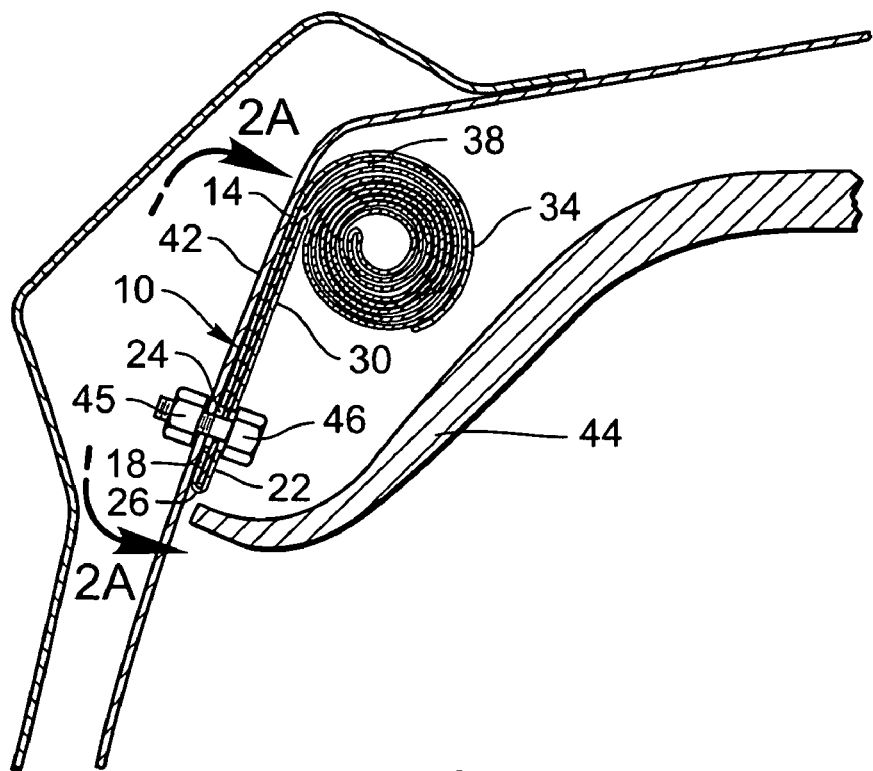
FIG. 2 is a cross-sectional view of the mounting system of FIG. 1 that is being used to mount an inflatable curtain (in the rolled configuration) to a vehicle.
Figure 3:
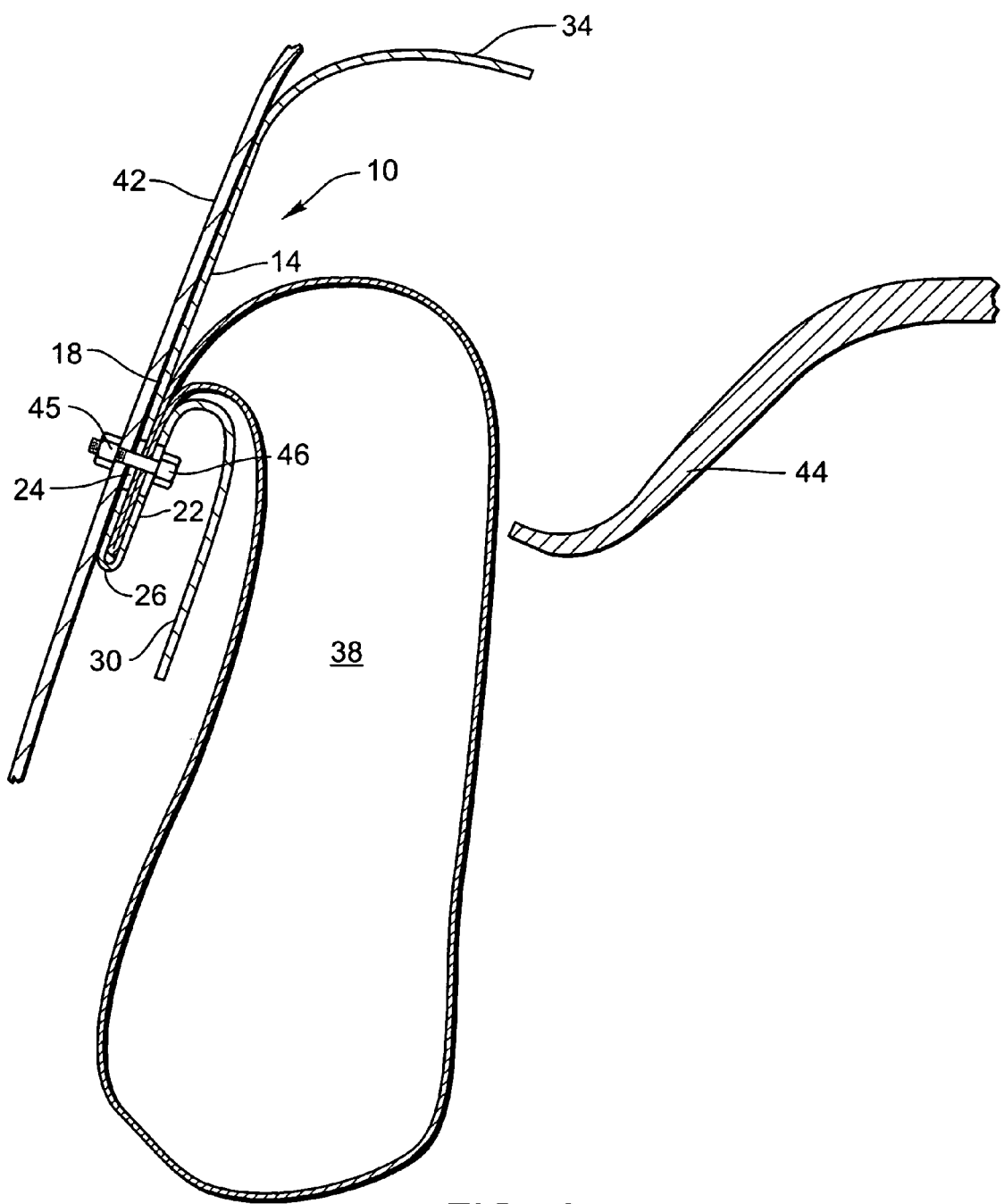
FIG. 3 is a cross-sectional view of the mounting system of FIG. 1 that is being used to mount an inflatable curtain (in the deployed configuration) to a vehicle.

Referring now to FIG. 1, a mounting system 10 according to the present embodiments is illustrated. The mounting system 10 is used to mount an inflatable curtain (shown in FIG. 2) to a vehicle (shown in FIG. 2). As is known in the art, the inflatable curtain will generally have a rolled configuration (shown in FIG. 2) and a deployed configuration (as shown in FIG. 3). As is known in the art, the inflatable curtain is designed such that when it is in the deployed configuration, it will protect a vehicle occupant during a crash.

The mounting system 10 will generally comprise a P-type mounting bracket 14. As explained above, a "P-type" mounting bracket is a mounting bracket that mounts an inflatable curtain to a vehicle such that after attachment, the rolled portion of the inflatable curtain is positioned above all or a substantial portion of the mounting bracket. A variety of different types of P-type mounting brackets are known in the art and may be used in conjunction with the mounting system 10. As noted above, an example of a P-type bracket is shown in the '390 application.

In the embodiment shown in FIG. 1, the mounting bracket 14 is made of metal (or another suitable material) and includes a back member 18 and a front member 22. The back member 18 and the front member 22 are designed such that, when used in a vehicle, a portion of the inflatable curtain will fit between the members 18, 22. As is known in the art, a fastener (not shown in FIG. 1) may then be passed through openings 24 in the members 18, 22. The addition of this fastener operates to compress the front member 22 onto the back member 18 and secure the portion of the inflatable curtain between these two members 18, 22.

In the embodiment shown in FIG. 1, the back member 18 and the front member 22 are simply portions of the same structure that are separated by a fold 26. Of course, other embodiments may also be constructed in which the members 18, 22 are separate pieces that must be joined via a fastener, adhesive, welding, or some other mechanism. Still further embodiments may be made in which the shape, configuration, construction and/or structure of one or more of the members 18, 22 differs from that which is shown in FIG. 1.

An energy absorbing member 30 is also associated with the mounting bracket 14. As used herein, the term "associated with" means that, when mounted on a vehicle, the energy absorbing member 30 contacts, engages, is formed integral with, and/or is used in conjunction with the mounting bracket 14. In some embodiments, this "association" between the bracket 14 and the energy absorbing member 30 occurs by having the energy absorbing member 30 be attached/connected to the front member 22, back member 18 or other portions of the bracket 14 via welding, fasteners, adhesives, bonding, joining, or other mechanisms. In other embodiments, the "association" between the energy absorbing member 30 and the bracket 14 occurs by having the energy absorbing member 30 be formed integral with the front member 22 (as shown in FIG. 1), the back member 18, or another portion of the bracket 14.

In the embodiment shown in FIG. 1, the energy absorbing member 30 is integral with the front member 22 and comprises a panel or tab that extends from the front member 22. As will be described in greater detail below, the length and shape of the energy absorbing member 30 is selected such that the member 30 will engage the inflatable curtain when the curtain is in its rolled configuration. Of course, other shapes, lengths, configurations, and/or structures may be used as the energy absorbing member 30. Still further embodiments may be constructed in which the energy absorbing member 30 is not integral with the front member 22 and/or any other portion of the bracket 14.

The energy absorbing member 30 may be made of a variety of different materials such as metal, an engineered polymer, and/or a hybrid or combination of a metal and an engineered polymer. It should be noted, however, that if metal is used, the leading edge 32 and/or other portions of the energy absorbing member 30 that engage the curtain may need to have hemmed or deburred edges in order to ensure that the energy absorbing member 30 does not puncture or tear the inflatable curtain airbag. In other embodiments, the leading edge 32 of the energy absorbing member has a non-puncture configuration so not to puncture the inflatable curtain during deployment.

The mounting bracket 14 may additionally comprise a curved arm 34. The curved arm 34 is attached/connected to the back member 18. The curved arm 34 is designed to engage a portion of the inflatable curtain when the curtain is in the rolled configuration (as shown in FIG. 2). Accordingly, as shown in FIG. 1, the curved arm 34 will generally have an inverted U-shape when the inflatable curtain is in the rolled configuration.

The size of the mounting bracket 14 may be selected and adjusted based upon the size of the curtain, the size of the vehicle, and other factors known in the art. Currently, brackets 14 which have a height (which is the distance between the opening 24 on the back panel 18 and the end of the curved arm 34) of 60 millimeters, 45 millimeters, and 30 millimeters have been constructed. Other heights, dimensions, and/or sizes of the brackets 14 are also possible.

Figure 2A:
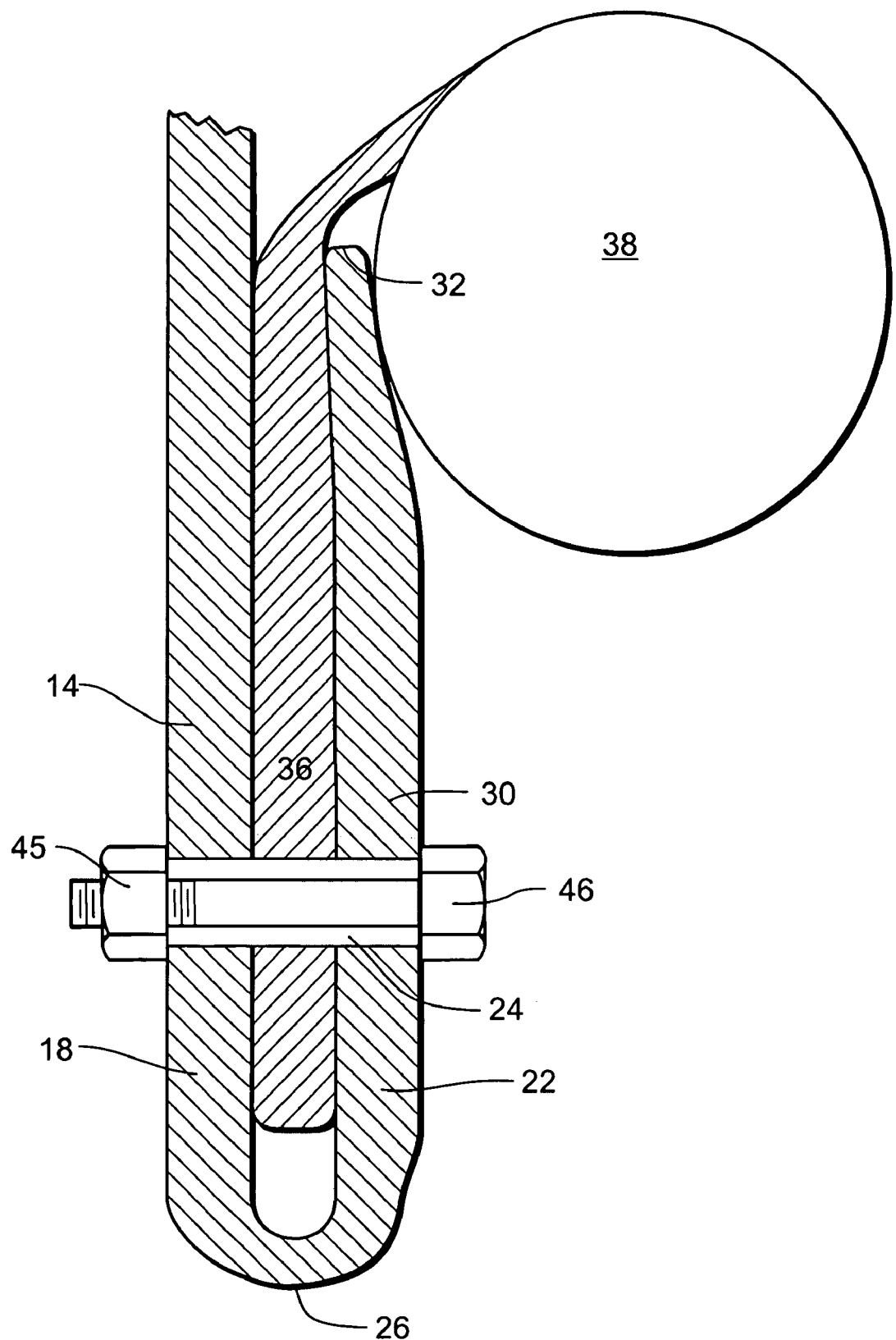
FIG. 2A is a cross sectional view of a portion of FIG. 2.

Referring now to FIGS. 2 and 2A, the mounting system 10 is illustrated as a means of attaching an inflatable curtain 38 to a surface of the vehicle 42. FIG. 2A is an exploded view of a section of FIG. 2 that has been expanded for clarity. As shown in FIGS. 2 and 2A, the inflatable curtain 38 is in the rolled (stowed) configuration. A vehicle headliner 44 is used to cover the curtain 38 and improve the visual appearance of the interior of the vehicle 42. A fastener 46 has been added and passed through the bracket 14 (and more particularly through the openings 24 in the back member 18 and the front member 22). The fastener 46 engages the vehicle 42 and holds the mounting bracket 14 onto the vehicle 42. The fastener 46 also engages a cushion mounting tab 36 (or other similar structure) of the inflatable curtain 38 and secures this portion of the curtain between the front member 22 and the back member 18. In some embodiments, a washer (not shown), a nut 45 and/or other similar structures may also be used in conjunction with the fastener 46.

The curved arm 34 is designed to engage the inflatable curtain 38 when the curtain 38 is in the rolled configuration (as specifically shown in FIG. 2). More specifically, the curved arm 34 will go over the top of the rolled curtain 38 to engage the curtain and hold it in the proper configuration and location. It should be noted that, if the curved arm 34 is made of metal, the curved arm 34 may again need to include hemmed and/or deburred edges in order to ensure that the engagement of the curved arm 34 and the inflatable curtain 38 does not puncture or tear the curtain 38. Of course, in other embodiments, the curved arm 34 may be coated with a paint or a plastic material to ensure that it does not tear or puncture the curtain inflatable 38.

When the inflatable curtain 38 is in the rolled configuration, the energy absorbing member 30 will engage a portion of the inflatable curtain 38. More specifically, after the fastener 46 has been passed through the bracket 14, the energy absorbing member 30 will be parallel (or substantially parallel) to the back member 18. In this position, the energy absorbing member 30 extends such that the leading edge 32 of this feature engages and/or contacts a portion of the rolled curtain 38. In this embodiment, the leading edge 32 will be constructed such that it will not puncture the inflatable curtain during deployment. Of course, other embodiments will be constructed such that portions of the energy absorbing member 30, other than the leading edge 32, engage and/or contact the rolled curtain 38.

FIG. 3 shows the manner in which the mounting system 10 prevents the mounting bracket 14 from separating from the vehicle 42 during deployment of the inflatable curtain 38. Specifically, in FIG. 3, the inflatable curtain 38 is shown in the deployed configuration. As is known in the art, deployment of the curtain 38 occurs when pressurized gas fills the curtain 38 and causes the curtain 38 to deploy into a position that will protect a vehicle occupant. In turn, this deployment of the curtain 38 moves the headliner 44 so that the curtain 38 can be deployed into the interior of the vehicle 42.

The deployment of the curtain 38 into the deployed configuration will deform the curved arm 34. More specifically, as the curtain 38 inflates and moves, the force of the movement will deform the curved arm 34 such that the curved arm 34 does not interfere with the inflation/deployment of the curtain 38. Generally, this will involve deforming the curved arm 34 such that the curved arm 34 no longer comprises a pronounced "inverted U-shape".

In some embodiments, this deformation of the curved arm 34 will cause the curved arm 34 to become perpendicular or substantially perpendicular to the back member 18. "Substantially perpendicular" means that the curved arm 34 will extend outwardly from the back member 18 in a generally perpendicular direction. In other embodiments, the curved arm 34 may deform in other ways and may not have a shape that is perpendicular or substantially perpendicular to the back member 18.

Perhaps more importantly, the mounting system 10 is designed such that the energy absorbing member 30 will deform and absorb energy when the inflatable curtain 38 is deployed from the rolled configuration into the deployed configuration. More specifically, because the leading edge 32 (or another portion of the energy absorbing member 30)

engages the curtain 38, the deployment/movement of the curtain 38 will, of necessity, deform and move the energy absorbing member 30.

In some embodiments, the leading edge 32 of the energy absorbing member 30 will deform in the substantially the same direction as the direction of deployment of the inflatable curtain. Accordingly, as the curtain 38 is being deployed downwardly towards the interior of the vehicle 42, the leading edge 32 (in this embodiment) may likewise be deformed downwardly towards the interior of the vehicle 42. Of course, in other embodiments of the mounting system 10, the energy absorbing member 30 may deform in other ways and/or in other directions.

Figure 4:
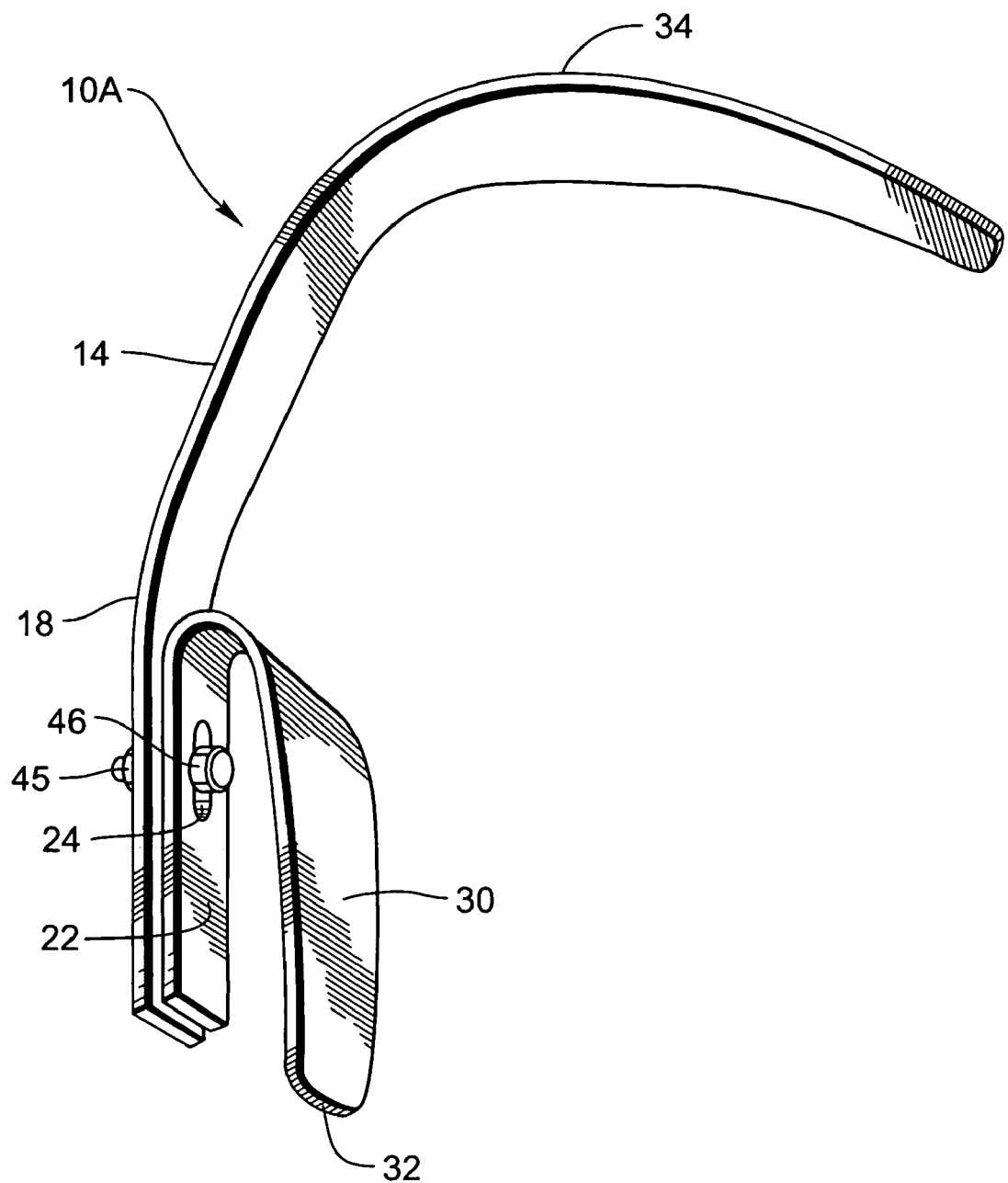
FIG. 4 is a perspective view of the mounting system of FIG. 3 without the vehicle and the inflatable curtain airbag, thereby showing in greater detail the deformation that the components of the mounting system may undergo during deployment of the inflatable curtain.

Referring now to FIG. 4, the deformation of the energy absorbing member 30 will be shown in greater detail. FIG. 4 comprises a second embodiment of the mounting system 10a in which the front member 22 is a separate piece from the back member 18. However, in other regards, the mounting system 10a is identical to the mounting system 10 shown and described above.

FIG. 4 shows the mounting system 10a after the curtain 38 has been deployed; however, for purposes of clarity, the vehicle 42 and the curtain 38 have been removed so that the mounting system 10a may be clearly illustrated. The leading edge 32 of the energy absorbing member 30 has been turned down in the same direction as the deployment of the curtain. Thus, in the embodiment shown in FIG. 4, a portion of the energy absorbing member 30 becomes deformed into an inverted U-shape in which a portion of the energy absorbing member 30 becomes generally parallel to the front member 22. Likewise, the curved arm 34 has also been deformed such that it is substantially perpendicular to the back member 18.

Referring now to FIGS. 3 and 4, the advantages of the mounting systems 10, 10a will now be described. Specifically, as the energy absorbing member 30 deforms during deployment of the curtain 38, some of the energy associated with the deployment will be absorbed/dissipated by the energy absorbing member 30. This absorption of energy spreads the load and the stresses over a greater area and prevents the load/force of the deployment from separating or tearing the mounting tab from the mounting bracket 14 from the vehicle 42 under normal deployment conditions. ("Normal deployment conditions" refer to the conditions that would normally be experienced during a crash—i.e., the pressures, temperature, and severity of the crash that would normally be encountered and expected during normal, routine use of the vehicle.) Rather, under normal conditions, the mountings brackets 14 will remain affixed to the vehicle 42 so that the curtain remains positioned in a location that will provide protection to the vehicle occupant.

Referring now to all of the Figures generally, those of skill in the art will also recognize that the mounting systems 10, 10a of the present embodiments may also provide for a method for preventing the inflatable curtain 38 from detaching from the vehicle 42 during deployment. This method will involve the steps of mounting the curtain 38 (in the manner described above) to the vehicle using the systems 10, 10a and then engaging the energy absorbing member 30 to the curtain 38 in the rolled configuration. Once this energy absorbing member 30 has been engaged to the curtain 38, the system 10 will prevent the bracket 14 from disengaging from the vehicle 42 during a crash (in the manner described above).

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A mounting system for mounting an inflatable curtain to a vehicle, the inflatable curtain having a rolled configuration and a deployed configuration, the system comprising:
    a P-type mounting bracket having a curved arm with a substantially inverted U-shape and disposed on top of the rolled inflatable curtain,
    an energy absorbing member associated with the P-type mounting bracket, the energy absorbing member engaging the inflatable curtain in the rolled configuration, wherein the energy absorbing member will deform away from the curved arm and absorb energy when the inflatable curtain is deployed from the rolled configuration into the deployed configuration, and
    wherein the mounting bracket comprises a back member and a front member, the mounting bracket being constructed such that a fastener mounts the inflatable curtain to the vehicle by passing through the back member and the front member, wherein the energy absorbing member is associated with the front member.

2. A mounting system as in claim 1 wherein the energy absorbing member is integral with the mounting bracket.

3. A mounting system as in claim 1 wherein the energy absorbing member absorbs energy of deployment, thereby preventing a cushion mounting tab from separating from the vehicle under normal deployment conditions.

4. A mounting system as in claim 1 wherein the leading edge of the energy absorbing member will deform in the substantially the same direction as the direction of deployment of the inflatable curtain.

5. A mounting system as in claim 1 wherein deployment of the inflatable curtain deforms the energy absorbing member into an inverted U-shape.

6. A mounting system as in claim 1 wherein the energy absorbing member is substantially parallel to the back member when the inflatable curtain is in the rolled configuration.

7. A mounting system as in claim 1 wherein deployment of the inflatable curtain deforms the energy absorbing member such that a portion of the energy absorbing member becomes generally parallel to the front member.

8. A mounting system as in claim 1 wherein the curved arm engages the inflatable curtain in the rolled configuration, and deployment of the inflatable curtain deforms the curved arm.

9. A mounting system as in claim 8 wherein deployment of the inflatable curtain deforms the curved arm such that the curved arm is substantially perpendicular to a back member of the mounting bracket.

10. A mounting system as in claim 1 wherein the leading edge of the energy absorbing member has a non-puncture configuration so not to puncture the inflatable curtain during deployment.

11. A mounting system for mounting an inflatable curtain to a vehicle, the inflatable curtain having a rolled configuration and a deployed configuration, the system comprising:
    a P-type mounting bracket, the mounting bracket comprising:
        a back member;
        a front member, the bracket being constructed such that a fastener mounts the inflatable curtain to the vehicle by passing through the back member and the front member; and a curved arm that is attached to the back member, the curved arm having an inverted U-shape and being disposed on top of the rolled inflatable curtain; and an energy absorbing member that is integral with the front member, the energy absorbing member engaging the inflatable curtain in the rolled configuration, wherein the energy absorbing member will deform and absorb energy when the inflatable curtain is deployed from the rolled configuration into the deployed configuration.

12. A mounting system as in claim 11 wherein the energy absorbing member is substantially parallel to the back member when the inflatable curtain is in the rolled configuration, and wherein deployment of the inflatable curtain deforms the energy absorbing member such that a portion of the energy absorbing member becomes generally parallel to the front member.

13. A mounting system as in claim 12 wherein the energy absorbing member absorbs energy of deployment, thereby preventing the mounting bracket from separating from the vehicle tinder normal deployment conditions.

14. A mounting system as in claim 13 wherein deployment of the inflatable curtain deforms the curved arm and causes the curved arm to become substantially perpendicular to the back member.

* * * * *

UNITED STATES PATENT AND TRADEMARK OFFICE
CERTIFICATE OF CORRECTION

PATENT NO. : 7,597,342 B2  Page 1 of 1
APPLICATION NO. : 11/441538
DATED : October 6, 2009
INVENTOR(S) : Blake L. Cheal It is certified that error appears in the above-identified patent and that said Letters Patent is hereby corrected as shown below:

In claim 4, column 8, line 33, please replace "deform in the substantially the same direction" with --deform in substantially the same direction--

In claim 13, column 10, line 8, please replace "tinder normal" with --under normal--

Signed and Sealed this

Seventeenth Day of November, 2009

David J. Kappos
*Director of the United States Patent and Trademark Office*